Jan. 23, 1923.
J. SWINLAND.
OCCUPANT PROPELLED VEHICLE.
FILED OCT. 3, 1921.
1,443,153.
2 SHEETS—SHEET 1.
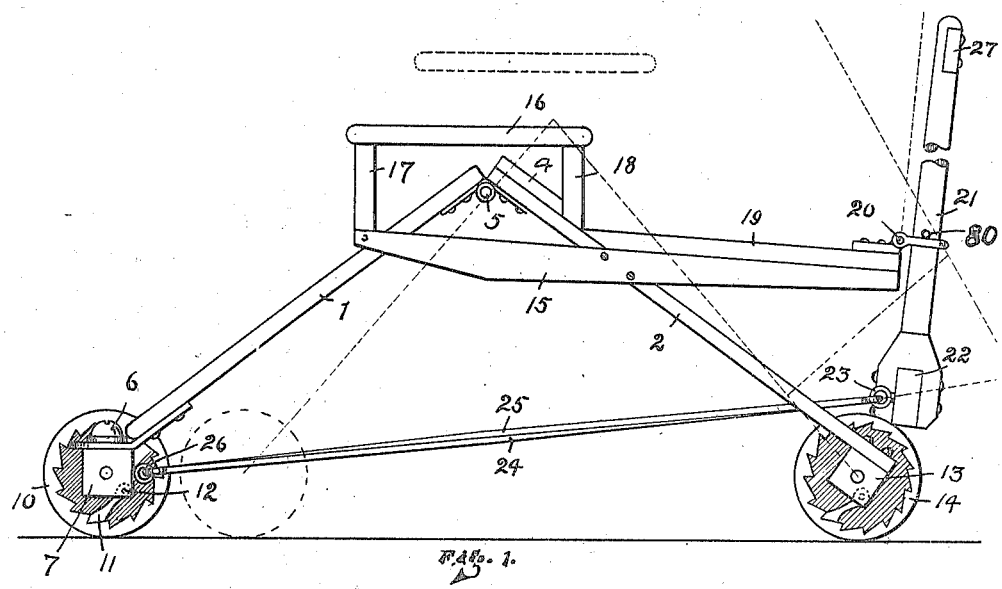
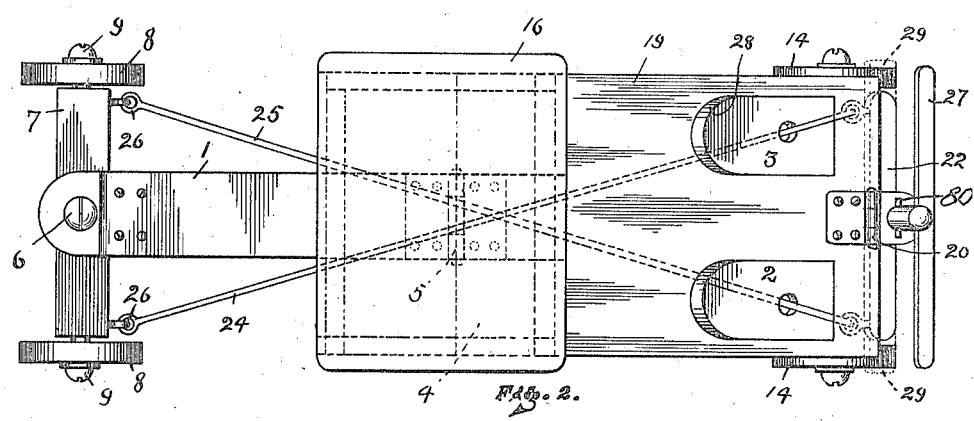
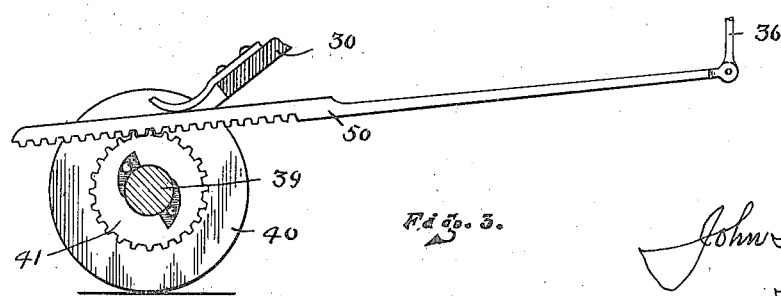
Inventor
John Swinland,
Geo. Stevens.
Attorney Jan. 23, 1923.
J. SWINLAND.
OCCUPANT PROPELLED VEHICLE.
FILED OCT. 3, 1921.
1,443,153.
2 SHEETS—SHEET 2.
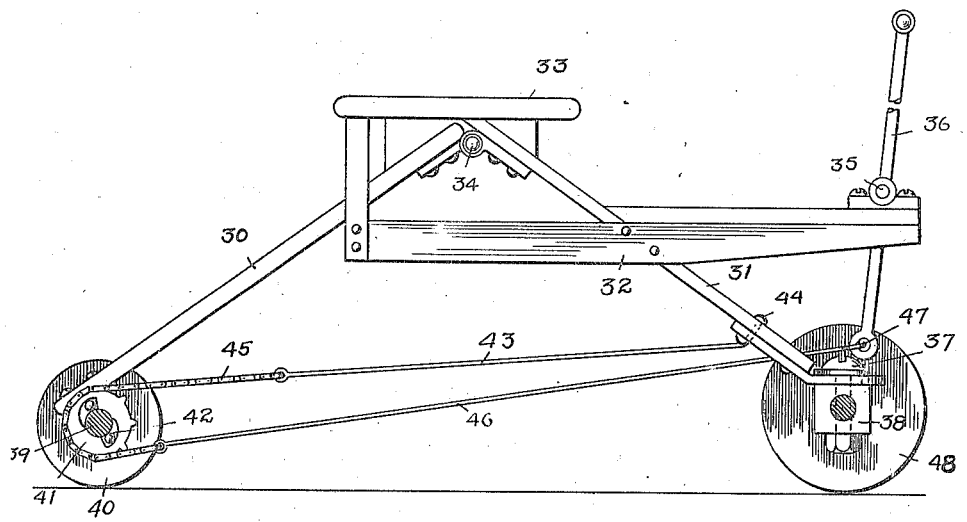
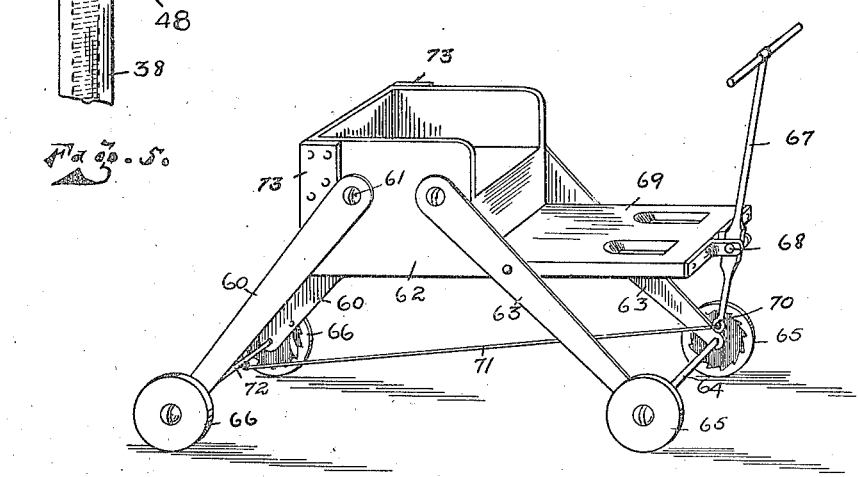
Inventor
John Swinland
Geo. Stevens
Attorney Patented Jan. 23, 1923.

1,443,153

UNITED STATES PATENT OFFICE.

JOHN SWINLAND, OF DULUTH, MINNESOTA.

OCCUPANT-PROPELLED VEHICLE.

Application filed October 3, 1921. Serial No. 505,030.

*To all whom it may concern:*

Be it known that I, JOHN SWINLAND, a citizen of the United States, residing at Duluth, in the county of St. Louis and State of Minnesota, have invented certain new and useful Improvements in an Occupant-Propelled Vehicle, of which the following is a specification, reference being had therein to the accompanying drawing.

This invention relates to vehicles and has special reference to a hand propelled child's vehicle; the principal object being to provide a novel form of amusement device for children.

Other objects and novel features of the device will appear in the further description of the invention.

Referring to the accompanying drawing forming part of this application in which like reference characters indicate like parts:

Figure 1 is a side elevation of one embodiment of my invention showing the two rear wheels of the vehicle as being removed.

Figure 2 is a plan view of a completely assembled vehicle,

Figure 3 is a fragmental portion of one of the vehicles showing a modified form of propelling device, Figure 4 is a view similar to Figure 1 showing a still further modified form of propelling device, Figure 5 is a fragmental portion of the front axle of the vehicle shown in Figure 4, and Figure 6 is a perspective view of a still further modified embodiment of the invention.

1, 2 and 3 represent the principal portions of the chassis of the vehicle, they preferably being of wood and are narrow elongated strips, the ones 2 and 3 being held together at their uppermost end by a cross piece 4, to which is centrally and hingedly united as at 5 the upper end of the piece 1. The lower end of this piece 1 is pivotally mounted as at 6 to the center of the square wooden rear axle 7 mounted upon the rear wheels 8, journalled upon screws 9 or other simple form of construction.

I have shown the wheels 8 as being provided on their innermost edges with a toothed or ratched rim 10 in which is cooperatively engaged the gravity pawl 11 pivotally mounted on one corner of the axle 7, as at 12.

The forward ends of the members 2 and 3 are rigidly fixed to the front axle 13 which is similar in shape to the rear axle 7, it being carried upon wheels 14 in all respects similar to the wheels 8 and which wheels 14 are provided with a like construction of pawl and ratchet to prevent their backward rotation, the pawl and ratchet of the rear wheels also being to prevent their backward rotation.

The members 1, 2 and 3 of the chassis frame are normally humped, that is their lower ends are drawn towards each other for the purpose of elevating their pivotally united ends, forming a slightly obtuse angle intermediate of the members. Rigidly fastened to the outer sides of the members 2 and 3 are the side members 15 which extend both forwardly and rearwardly of the members 2 and 3, and are disposed substantially horizontally.

Above the pivotal connection or apex of the hump of the chassis is mounted a suitable seat 16, the rear edge of which is supported upon the cross piece 17 resting on the rear extremity of the side bars 15, and the front edge resting upon the cross piece 18 upon the inclined faces of the members 2 and 3, and a suitable floor or platform 19 is fixed transverse the forwardly projecting portions of the side bars.

Centrally upon the front edge of the platform 19 is pivotally hinged as at 20 the vertically disposed operating lever 21, it being also rotative within said hinged connection, by the through supporting pin 80 within said lever and resting upon the half of the hinge through which the lever is loosely mounted. The lower end of this lever carries a cross piece 22 just in front of the front wheels 14, said lever being bifurcated upon its lower end and carrying the cross piece 22 rigidly fixed within said bifurcated portion. Adjacent the extreme ends of this cross piece 22 are suitable eye bolts 23 in which are attached cross rods 24 and 25 which lead backwardly and diagonally of the chassis to the ends of the axle 7 where they are similarly attached as at 26, thus forming a steering device for the vehicle, it being remembered that the rear axle 7 pivotally supports the rear end of the chassis as at 6. The upper end of the lever 21 is provided with a hand cross bar 27 which is gripped by the child in operating the vehicle, and as he pulls the upper end of the lever back and forth it is evident that the rear axle, together with its wheels and rear portion of the chassis will be reciprocated back and forth, that is to say its relative backward motion will be brought about by the advance motion of the forward wheels caused by the gravitating effect of the child's body on the vehicle, as the wheels are prevented from rotating backwardly at all times.

Openings 28 are shown in the forward corners of the platform 19 as convenient footrests for the operator of the vehicle.

A child thus operating the vehicle will therefore be given a forward as well as vertically reciprocal motion, somewhat like that of horseback riding, which has proven very attractive to children.

If desired the extreme ends of the cross bar 22 may be sufficiently extended as indicated at 29 so as to be brought into engagement with the circumferential face of the forward wheels 14 and act as a brake therefor to control their rotation, as for example when coasting.

In the construction shown in Figure 4 I have modified the propelling mechanism as well as the steering of the vehicle, and, while the chassis, seat, and general frame structure is practically the same, I will refer to the humped members as 30 and 31, the side bars as 32, the seat as 33, the pivotal connection of the humped members as 34, the pivotal connection of the operating lever as 35, and the lever itself as 36. Now in this structure the forward members 31 are pivotally mounted as at 37 to the front axle 38, while the rearmost member of the chassis 30 is rigidly fixed to the axle or bolster, as the shaft 39 in this instance is rotatable within the bolster and carries the rear wheels 40 rigidly fixed thereto.

The cogged wheel 41 is mounted upon the rear axle 39, it having a ball ratchet or clutch arrangement indicated at 42 which is common to similar devices and which prevents backward rotation of the shaft independent of the wheel 41 and acting in all respects like a pawl and ratchet. A rod 43 is rigidly fixed as at 44 to the forward lower end of the chassis leading backwardly towards the wheel 41 where it is provided with a sprocket chain 45 passing around the cogged or sprocket wheel 41 and its opposite end attached to the rod 46, similar to the rod 43. The opposite end of this rod is connected as at 47 to the lower end of the operating lever 36.

The front axle 38 pivotally supports the forward end of the chassis and is provided beyond the front wheels 48 with extensions 49 suitably shaped for foot rests for the operator and which may be adjusted back and forth when the machine is in progress for steering same, only independently of the propulsion thereof.

In this embodiment of the invention when the operator pulls backwardly upon the upper end of the lever 36 the rod 46 will be drawn forwardly rotating the sprocket wheel 41 backwardly free of any effect upon the shaft 39, except that the latter is drawn bodily forwardly a comparatively short distance which will of course rotate the hind wheels 40, it being understood that the child in performing such action has a tendency to lessen his weight upon the seat permitting of such action of the hind wheels in preference to that of rotating the forward wheels backwardly, it being considered not necessary to equip either set of wheels with ratchet equipment as described in the previously related embodiment of the invention. Now as the child releases his pull upon the lever 36 it is apparent that any attempt of the wheels 40 to rotate backwardly will be retarded by the attempted forward rotation of the sprocket wheel 41 by the ball clutch 42 being brought into action. However the forward wheels being free to rotate forwardly will proceed to do so by the gravitating effect of the child's weight, the front axle 38 being moved, carrying with it the fixed end of the rod 43. This will result in a forward pull or stress upon said rod which will have a tendency to rotate forwardly the rear wheels 40, the front wheels 48 being made slightly larger in diameter than the rear wheels in order to provide easier rotation thereof than the smaller wheels.

As a modification of the propelling mechanism described in the embodiment of the invention shown in Figure 4, attention is directed to that shown in Figure 3, wherein the sprocket or cogged wheel 41 is driven by a reciprocable rack 50 pivotally attached to the end of the operating lever 36 and by which device the shaft 39 carries the wheels 40 rigidly fixed thereto for rotating in a forward direction advancing the rear axle by actual rotation rather than being drawn forwardly by the two previously described methods.

In Figure 6 I have illustrated still another embodiment of the invention wherein no steering device whatever is provided the vehicle only being capable of traveling in a straight line, and instead of the humped parts of the chassis being pivotally united I have shown only the rearwardly projecting legs 60 as being pivotally attached at 61 to the box like body portion 62 of the chassis. The rearwardly inclined legs 63 of this embodiment of the invention carries the forward axle 64 upon which the front wheels 65 are mounted, they being provided with the ratchet and pawl arrangement, similar to that shown in Figure 1, for preventing backward rotation, as is also the rear wheels 66. In this embodiment the operating lever 67 is pivotally mounted as at 68 to the forward end of the platform 69 of the chassis and the lower end 70 of said lever is connected by means of the rod 71 to the rear axle 72 and the backward thrust of the legs 60 is controlled by suitable blocks 73 fixed to the rear corners of the body of the chassis.

Having thus described my invention, what I claim and desire to secure by Letters Patent is:

1. A vehicle of the class described comprising a wheeled forward axle and a wheeled rear axle, an inclined frame structure mounted upon the forward axle and carrying a seat and platform thereupon, a rearwardly and downwardly inclined portion of the frame structure carried by the rear axle and pivotally united to the other inclined portion of the structure, a hand lever pivotally carried upon the forward end of the platform, means connecting the lower end of the lever with the rear axle whereby the manipulating of the lever will reciprocate the axle, substantially as and for the purpose described.

2. A child's vehicle of the class described comprising a hingedly united chassis, a pivotally mounted operating lever in the forward end of the chassis, wheels constantly supporting the forward end of the chassis and wheels supporting the rear end of the chassis, and means connecting the lever with the rearmost wheels substantially as and for the purpose described.

3. A vehicle comprising a humped chassis hingedly united intermediate of the ends thereof, means carried upon the forward end of the chassis for producing intermittent forward motion of the rear portion thereof manually, and cooperative means for producing alternate intermittent additional forward motion of said vehicle by the weight of the operator's body.

In testimony whereof I hereunto affix my signature in the presence of two witnesses.

JOHN SWINLAND.

Witnesses:
S. C. Bronson,
S. Geo. Stevens.